United States Patent Office 3,225,115

Patented Dec. 21, 1965

3,225,115

CURABLE COMPOSITIONS CONTAINING EPOXY ALCOHOL, UNSATURATED POLYCARBOXYLIC ACID AND UNSATURATED MONOMER

Charles W. McGary, Jr., and Charles T. Patrick, Jr., South Charleston, W. Va., assignors to Union Carbide Corporation, a corporation of New York No Drawing. Filed Dec. 28, 1960, Ser. No. 78,847

6 Claims. (Cl. 260—861)

This invention relates to epoxide compositions. In one aspect, the invention relates to curable, polymerizable compositions comprising a monoepoxy alcohol compound, an olefinically unsaturated polycarboxylic acid anhydride, and a monomeric ethylenically unsaturated compound. In various other aspects, the invention relates to the fusible, thermosetting intermediate reaction products, and to the cured, polymerized products which result from the curing of the aforementioned curable, polymerizable compositions.

The polymerizable compositions of the invention can be readily handled in resin-forming operations such as coating, laminating, bonding, molding, casting, potting, encapsulating, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions can be cured in molds which have intricate surfaces, and the resulting molded resin exhibits exact and fine details of the mold. The polymerizable compositions, also, can be advantageously employed in the potting of fragile articles such as electronic components. Moreover, the polymerizable compositions of the invention are readily cured to bubble-free resins.

The polymerizable compositions and cured compositions of the invention have been found to possess several high desirable and unexpected advantages. The inclusion of the monomeric ethylenically unsaturated compound in the curable system results in appreciable lowering of the melt temperature and in appreciable reduction of the viscosity of the curable system as compared to the corresponding curable system lacking same. It should be noted that low melting compositions are a decided advantage to epoxy resin formulators engaged, for example, in the molding arts. Generally, the inclusion of the monomeric ethylenically unsaturated compound markedly increases the reactivity of the curable system, and consequently, gelation can be effected at far lower temperatures, e.g., room temperature, in shorter periods of time than the corresponding system which lacks said monomeric ethylenically unsaturated compound. Fast gel times, particularly at relatively low temperatures, is a significant advantage in the mass production of plastic parts since the molding equipment is tied up for a minimum period. Many of the cured resins of the invention exhibit extraordinarily high and efficient thermal stability at elevated temperatures by virtue of the contained monomeric ethylenically unsaturated organic compound in the curable compositions. In general, the cured resins of the invention exhibit decided improved resistance to water and caustic than the corresponding cured resins which are prepared from curable compositions lacking the ethylenic compound. Furthermore, the inclusion of the monomeric ethylenic unsaturated compound drastically reduces the cost of the curable formulations of the invention as compared to an equal weight of the corresponding curable formulations which lack the ethylenic compound. This economical aspect is made possible by diminishing the quantity of the most expensive component, i.e., the monoepoxy alcohol component, and replacing it with the exceedingly inexpensive or relatively inexpensive ethylenic component. In addition, the practice of the invention permits the preparation of "tailor-made" resins.

The thermoset cured resins of the invention vary from soft and flexible to hard and rigid products, depending upon the proportion, the functionality, and the chain length of the components employed. These resins are insoluble in many of the organic solvents. The hard, infusible, rigid, thermoset resins can be machined to desired shapes and configurations, and they can be polished to provide appealing finishes. The novel compositions, as indicated previously, are highly useful and valuable in fields such as the coatings, laminating, molding, encapsulation, adhesive, etc., arts.

Accordingly, one or more of the following objects will be achieved by the practice of the invention.

It is an object of the invention to prepare novel curable, polymerizable compositions comprising a monoepoxy alcohol compound, an olefinically unsaturated polycarboxylic acid anhydride, and a monomeric ethylenically unsaturated compound which contains at least one ethylenic group, i.e., $>C=C<$, which is polymerizable with said anhydride. It is another object of the invention to prepare fusible, thermosetting intermediate reaction products, and hard thermoset solid products which result from the curing of the above-said curable, polymerizable compositions. It is another object of the invention to prepare novel curable, polymerizable compositions which possess relatively low melt temperature, relatively low viscosities, and which readily gel at relatively low temperatures. It is a further object of the invention to prepare novel curable compositions and partially cured compositions (fusible thermosetting intermediate reaction products) which compositions when dissolved in an inert normally-liquid organic medium are useful in the fields of coatings, laminates, adhesives, and the like. A still further object of the invention is to prepare novel fusible thermosetting intermediate reaction solid products resulting from the partial reaction of the aforementioned curable compositions which products are useful as molding powder compositions. Another object of the invention is directed to the preparation of novel cured resins which exhibit excellent thermal stability at elevated temperatures. A still further object of the invention is directed to the preparation of partially cured and cured compositions which can be made relatively inexpensive by the inclusion of a monomeric ethylenically unsaturated compound into the curable system. Numerous other objects will become apparent to those skilled in the art from a consideration of the disclosure.

It is desirable that the relative proportions of monoepoxy alcohol compound, olefinically unsaturated polycarboxylic acid anhydride, and monomeric ethylenically unsaturated compound comprising the curable composition are such as to provide from about 0.1 to about 5.0 carboxy groups, —COOH, of said anhydride per epoxy group of said monoepoxy alcohol compound. The quantity of monomeric ethylenically unsaturated compound is most conveniently based on a ratio of ethylenic groups of said monomeric ethylenically unsaturated compound per ethylenic group contained in said anhydride. Thus, it is desirable to employ the monomeric ethylenically unsaturated compound in an amount so as to provide from about 0.002 to about 5.0 ethylenic groups of said monomeric ethylenically unsaturated compound per ethylenic group of said polycarboxylic acid anhydride. It should be noted that the term "ethylenic group" refers to the >C=C< group. It should also be noted that by the expression "carboxy groups of said polycarboxylic acid anhydride" is meant the carboxy groups which would be contained by the corresponding polycarboxylic acid. For example, maleic anhydride does not possess any carboxy groups per se; however, the corresponding polycarboxylic acid is maleic acid which contains two free carboxy groups. Thus, maleic anhydride has two carboxy groups as applied in the above expression. In different language, by the expression "carboxy groups of polycarboxylic acid anhydride" is meant the carboxy groups contained in the "hydrated" polycarboxylic acid anhydride. It is preferred that the relative proportions of monoepoxy alcohol compound, olefinically unsaturated polycarboxylic acid anhydride, and monomeric ethylenically unsaturated compound are such as to provide from about 0.4 to about 3.0 carboxy groups of said anhydride per epoxy group of said monoepoxy alcohol compound, and from about 0.2 to about 2.0 ethylenic groups of said monomeric ethylenically unsaturated compound per ethylenic group of said anhydride.

The curable compositions of the invention can be partially cured or fully cured by maintaining the temperature in the range of from above about 25° C. to about 275° C., and higher, and preferably from above about 25° C. to about 200° C. A higher curing temperature generally will provide a thermosetting or thermoset resin in less time than a lower curing temperature. One desirable method is to heat the curable compositions to a temperature within the range from above about 25° C. to 150° C. to first partially cure the composition. A temperature from about 100° C. to 225° C. then can be used to complete the cure. However, any one or combination of two or more temperatures within the specified range of above about 25° C. to 275° C., and higher, can be employed, if desired, to effect the full cure. For casting purposes, the preferred minimum temperature of the normally-solid curable compositions is that at which said compositions form a uniform melt, whereas for coatings and the preparation of laminates, the use of solvents will allow the use of lower temperatures.

The time for effecting the partial cure or complete cure will be governed, to an extent, on several factors such as the particular monoepoxy alcohol component employed, the particular polycarboxylic acid anhydride component employed, the particular monomeric ethylenically unsaturated component employed, the proportions of the components employed, the inclusion of a catalyst, the temperature for effecting the cure, and other considerations. In general, the time for effecting the complete cure can vary from several minutes to 24 hours, and longer, e.g., from 10 minutes to 20 hours, depending upon the correlation of such factors as illustrated above.

If desired, acidic or basic catalysts can be incorporated into the curable compositions of the invention to increase the rate of reaction of the polycarboxylic acid anhydride and polyepoxide. It is generally suitable to add the catalyst to the curable composition which is maintained at a temperature in the range of, for example, from about 10° to 100° C. Agitation of the curable composition prior to, during, and after the incorporation of the catalyst is desirable to ensure a homogeneous mixture. If desired, higher temperatures may be employed with the possibility, however, of inducing premature and localized curing around catalyst particles prior to the formation of a homogeneous, curable mixture. In most cases, it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.001, and lower to about 5, and higher, weight percent, based on the weight of the monoepoxy alcohol component, are advantageous in forming valuable thermoset resins from the curable compositions.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride - piperidine complex, boron trifluoride - 1,6-hexane-diamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like. When the catalyst and curable compositions are immiscible, the catalyst can be added as a solution in an inert normally-liquid organic medium.

In addition, it is oftentimes desirable to add to the curable systems a free radical generator such as peroxide catalysts to facilitate the vinyl polymerization of the monomeric ethylenically unsaturated compound with the olefinically unsaturated polycarboxylic acid anhydride. It is preferred that the free radical generator be added to the curable system just prior to effecting the cure. Illustrative free radical generators include, for example, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like. Certain metallic activators can also be incorporated into the curable systems along with the free radical generators. Illustrative activators include, for instance, the salts of cobalt, copper, manganese, calcium, zinc, lead, iron, and the like, e.g., cobalt naphthenate, cobalt octanoate, lead octanoate and the like. The concentration of the free radical generators and the activators can range from about 0.001, and lower, to about 5, and higher, weight percent based on the total weight of the components in the curable formulation.

The monoepoxy alcohol compounds which are contemplated contains a single vicinal epoxy group, i.e.,

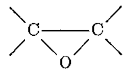

at least one alcoholic hydroxy group, i.e., —OH, and are free of ethylenic, acetylenic, and benzenoid unsaturation. It should be noted that the term "alcoholic hydroxy group," as used herein including the appended claims, refers to a hydroxy radical (—OH) which is monovalently bonded to an aliphatic or cycloaliphatic carbon atom. In contrast, the term "phenolic hydroxy group" refers to a hydroxy radical which is monovalently bonded to a benzenoid carbon atom, i.e., a carbon atom which is a part of the benzene ring. Those saturated monoepoxy alcohol compounds which contain solely carbon, hydrogen, and oxygen atoms are preferred. Monoepoxy alcohol compounds which contain one oxirane oxygen atom bonded to vicinal cycloaliphatic carbon atoms and which contain at least one alcoholic hydroxy group are especially preferred. The cycloaliphatic nucleus preferably contains from 5 to 7 carbon atoms including the epoxy carbon atoms. A single monoepoxy alcohol compound or a mixture of at least two monoepoxy alcohol compounds can be employed in the novel curable compositions.

Illustrative monoepoxy alcohol compounds which are contemplated in the invention include:

(a) 4-oxatetracylco$[6.2.1.0^{2,7}.0^{3,5}]$undecan-9-ol,
(b) 4-oxatetracylco$[6.2.1.0^{2,7}.0^{3,5}]$undec-9-oxyalkanol,
(c) 4-oxatetracyclo$[6.2.1.0^{2,7}.0^{3,5}]$undec-9-oxyalkane-poly-ol,
(d) 4-oxatetracyclo$[6.2.1.0^{2,7}.0^{3,5}]$undecane-9,10-diol,
(e) 4-oxatetracylco$[6.2.1.0^{2,7}.0^{3,5}]$undecane-10,11-diol,
(f) 10-oxapentacyclo$[6.3.1.1^{3,6}.0^{2,7}.0^{9,11}]$tridecan-4-ol,
(g) 10-oxapentacyclo$[6.3.1.1^{3,6}.0^{2,7}.0^{9,11}]$tridecane-4,5-diol,
(h) 10-oxapentacyclo$[6.3.1.1^{3,6}.0^{2,7}.0^{9,11}]$tridec-4-ylalkanol,
(i) 10-oxapentacyclo$[6.3.1.1^{3,6}.0^{2,7}.0^{9,11}]$tridec-4,5-ylene-dialkanol,
(j) 10-oxapentacyclo$[6.3.1.1^{3,6}.0^{2,7}.0^{9,11}]$tridec-4-oxyalkanol,
(k) 10-oxapentacyclo$[6.3.1.1^{3,6}.0^{2,7}.0^{9,11}]$tridec-4-oxyalkane-poly-ol,
(l) 10-oxapentacyclo$[6.3.1.1^{3,6}.0^{2,7}.0^{9,11}$tridec-4-ylmethylene-oxyalkanol,
(m) 10-oxapentacyclo$[6.3.1.1^{3,6}.0^{2,7}.0^{9,11}]$tridec-4-ylmethylene-oxyalkane-poly-ol,
(n) The 4 - oxatetracyclo$[6.2.1.0^{2,7}.0^{3,5}]$undec - 9 - oxy-(mono- and polyalkyleneoxy)alkanols which result from the monoepoxidation of the reaction products of tricyclo$[5.2.1.0^{2,6}]$dec-3-en-8-ol with a saturated aliphatic mono vicinal-epoxy-hydrocarbon,
(o) The 4-oxatetracyclo$[6.2.1.0^{2,7}.0^{3,5}]$undec-9,10-ylene-di[oxy(mono- and polyalkyleneoxy)alkanols] which result from the monoepoxidation of the reaction products of tricyclo$[5.2.1.0^{2,}6]$dec-3-ene-8,9-diol with a saturated aliphatic mono vicinal-epoxyhydrocarbon,
(p) The 4 - oxatetracyclo$[6.2.1.0^{2,7}.0^{3,5}]$undec - 10,11-ylene - di[oxy(mono- and polyalkyleneoxy)alkanols] which result from the monoepoxidation of the reaction products of tricyclo$[5.2.1.0^{2,6}]$dec-3-ene-9,10-diol with a saturated aliphatic mono vicinal-epoxyhydrocarbon,
(q) The 10 - oxapentacyclo$[6.3.1.1^{3,6}.0^{2,7}.0^{9,11}]$tridec-4-oxy(mono- and polyalkyleneoxy)alkanols which result from the monoepoxidation of the reaction products of tetracyclo$[5.2.1.0^{2,6}]$dodec-9-en-4-ol with a saturated aliphatic mono vicinal-epoxyhydrocarbon,
(r) The 10-oxapentacyclo$[6.3.1.1^{3,6}.0^{2,7}.0^{9,11}]$tridec - 4,5-ylene - di[oxy(mono- and polyalkyleneoxy)alkanols] which result from the monoepoxidation of the reaction products of tetracyclo$[6.2.1.1^{3,6}.0^{2,7}]$dodec - 9-ene-4,5-diol with a saturated aliphatic mono vicinal-epoxy-hydrocarbon,
(s) 10 - oxapentacyclo$[6.3.1.1^{3,6}.0^{2,7}.0^{9,11}]$tridec - 4 - yl-alkyleneoxyalkanol,
(t) The 10 - oxapentacyclo$[6.3.1.1^{36}.0^{2,7}.0^{9,11}]$tridec - 4-ylalkyleneoxy(mono- and polyalkyleneoxy)alkanols which result from the monoepoxidation of the reaction products of tetracyclo$[6.2.1.1^{3,6}.0^{2,7}]$dodec - 9 - en - 4-ylakanol with a saturated aliphatic mono vicinal-epoxy-hydrocarbon,
(u) 10 - oxapentacyclo$[6.3.1.1^{3,6}.0^{2,7}.0^{9,11}]$tridec - 4,5-ylene-di(alkyleneoxyalkanol),
(v) The 10 - oxapentacyclo$[6.3.1.1^{3,6}.0^{2,7}.0^{9,11}]$tridec-4,5-ylene - di[alkyleneoxy(mono- and polyalkyleneoxy)-alkanols] which result from the monoepoxidation of the reaction products of tetracyclo$[6.2.1.1^{3,6}.0^{2,7}]$dodec-9-en-4,5-ylene-dialkanol with a saturated aliphatic mono vicinal-epoxyhydrocarbon,
(w) Mono vicinal-epoxyalkanol,
(x) Mono vicinal-epoxycycloalkanol,
(y) Mono vicinal-epoxycycloalkylalkanol,
(z) Mono vicinal-epoxybicycloalkanols, and the like.

Specific examples of the 4-oxatetracyclo$[2.2.1.0^{2,7}.0^{3,5}]$undec-9-oxyalkanols include, for instance, 4-oxatetracyclo$[6.2.1.0^{2,7}.0^{3,5}]$undec-9-oxyn-n-pentanol,
4-oxatetracyclo$[6.2.1.0^{2,7}.0^{3,5}]$undec-9-oxyethanol,
4-oxatetracyclo$[6.2.1.0^{2,7}.0^{3,5}]$undec-9-oxy-n-propanol,
4-oxatetracyclo$[6.2.1.0^{2,7}.0^{3,5}]$undec-9-oxyisopropanol,
4-oxatetracyclo$[6.2.1.0^{2,7}.0^{3,5}$undec-9-oxy-n-butanol,
4-oxatetracyclo$[6.2.1.0^{2,7}.0^{3,5}]$undec-9-oxyisobutanol,
4-oxatetracyclo$[6.2.1.0^{2,7}.0^{3,5}]$undec-9-oxy-t-butanol,
4-oxatetracyclo$[6.2.1.0^{2,7}.0^{3,5}]$undec-9-oxy-n-hexanol,
4-oxatetracyclo$[6.2.1.0^{2,7}.0^{3,5}]$undec-9-oxy-n-octanol,
4-oxatetracyclo$[6.2.1.0^{2,7}.0^{3,5}]$undec-9-oxy-n-decanol,
and the like.

Illustrative examples of the 4-oxatetracyclo$[6.2.1.0^{2,7}.0^{3,5}]$undec-9-oxayalkane-poly-ols which are contemplated include, for instance, the 4-oxatetracyclo$[6.2.1.0^{2,7}.0^{3,5}]$undec-9-oxyalkanediols, e.g., the 4-oxatetracyclo$[6.2.1.0^{2,7}.0^{3,5}]$undec-9-oxypropanediols, the 4-oxatetracyclo$[6.2.1.0^{2,7}.0^{3,5}]$undec - 9-oxybutanediols, the 4-oxatetracyclo$[6.2.1.0^{2,7}.0^{3,5}]$undec - 9 - oxypentanediols, the 4 - oxatetracyclo$[6.2.1.0^{2,7}.0^{3,5}]$undec - 9 - oxyhexanediols, and the like; the 4-oxatetracyclo$[6.2.1.0^{2,7}.0^{3,5}]$undec - 9 - oxyalkanetriols, e.g., the 4-oxatetracyclo$[6.2.1.0^{2,7}.0^{3,5}]$undec - 9 - oxybutanetriols, the 4-oxatetracyclo$[6.2.1.0^{2,7}.0^{3,5}]$undec-9-oxypentanetriols, the 4-oxatetracyclo$[6.2.1.0^{2,7}.0^{3,5}]$undec - 9 - oxyhexanetriols, the 4 - oxatetracyclo$[6.2.1.0^{2,7}.0^{3,5}]$undec - 9 - oxyoctanetriols, and the like; the 4-oxatetracyclo$[6.2.1.0^{2,7}.0^{3,5}]$undec - 9 - oxyalkanetetrols, e.g., the 4-oxatetracyclo$[6.2.1.0^{2,7}.0^{3,5}]$undec-9-oxyhexanetetrols; and the like; the 4-oxatetracyclo$[6.2.1.0^{2,7}.0^{3,5}]$undec-9-oxyalkanepentols; and the like.

Typical 10 - oxapentacyclo$[6.3.1.1.^{3,6}.0^{2,7}.0^{9,11}]$tridec-4-yl-alkanols include, among others.

10-oxapentacyclo$[6.3.1.1^{3,6}.0^{2,7}.0^{9,11}]$tridec-4-ylmethanol,
10-oxapentacyclo$[6.3.1.1^{3,6}.0^{2,7}.0^{9,11}]$tridec-4-ylethanol,
10 - oxapentacyclo$[6.3.1.1.^{3,6}.0^{2,7}.0^{9,11}]$tridec - 4 - yl-n-propanol,
10 - oxapentacyclo$[6.3.1.1^{3,6}.0^{2,7}.0^{9,11}]$tridec - 4 - ylisopropanol,
10 - oxapentacyclo$[6.3.1.1^{3,6}.0^{2,7}.0^{9,11}]$tridec - 4 - yl-n-butanol,
10 - oxapentacyclo$[6.3.1.1^{3,6}.0^{2,7}.0^{9,11}]$tridec - 4 - yl-t-butanol,
10 - oxapentacyclo$[6.3.1.1^{3,6}.0^{2,7}.0^{9,11}]$tridec-4-ylisobutanol,
10 - oxapentacyclo$[6.3.1.1^{3,6}.0^{2,7}.0^{9,11}]$tridec-4-ylisohexanol,
10 - oxapentacyclo$[6.3.1.1^{3,6}.0^{2,7}.0^{9,11}]$tridec-4-yl-n-octan-2-ol,
10 - oxapentacyclo$[6.3.1.1^{3,6}.0^{2,7}.0^{9,11}]$tridec-4-yl-n-decanol,
and the like.

Among the 10 - oxapentacyclo$[6.3.1.1.^{3,6}.0^{2,7}.0^{9,11}]$tridec-4-oxyalkanols which are encompassed within the scope of the invention are, for example, 10 - oxapentacyclo$[6.3.1.1^{3,6}.0^{2,7}.0^{9,11}]$tridec - 4 - oxy-n-pentanol,
10 - oxapentacyclo$[6.3.1.1^{3,6}.0^{2,7}.0^{9,11}]$tridec - 4 - oxy-ethanol,
10 - oxapentacyclo$[6.3.1.1^{3,6}.0^{2,7}.0^{9,11}]$tridec - 4 - oxy-n-propanol,
10 - oxapentacyclo$[6.3.1.1.^{3,6}.0^{2,7}.0^{9,11}]$tridec - 4 - oxyisopropanol,
10 - oxapentacyclo$[6.3.1.1^{3,6}.0^{2,7}.0^{9,11}]$tridec - 4 - oxy-n-butanol,
10 - oxapentacyclo$[6.3.1.1^{3,6}.0^{2,7}.0^{9,11}]$tridec - 4 - oxyisobutanol,
10 - oxapentacylco$[6.3.1.1.^{3,6}.0^{2,7}.0^{9,11}]$tridec - 4 - oxy-t-butanol,
10 - oxapentacyclo$[6.3.1.1^{3,6}.0^{2,7}.0^{9,11}]$tridec - 4 - oxy-n-hexanol, 10-oxapentacyclo[6.3.1.1$^{3,6}$.0$^{2,7}$.0$^{9,11}$]tridec-4-oxy-n-octan-4-ol,
10-oxapentacyclo[6.3.1.1$^{3,6}$.0$^{2,7}$.0$^{9,11}$]tridec-4-oxy-n-dodecanol,
and the like.

Illustrative 10-oxapentacyclo[6.3.1.1$^{3,6}$.0$^{2,7}$.0$^{9,11}$]tridec-4-oxyalkane-poly-ols include, for instance, the 10-oxapentacyclo[6.3.1.1$^{3,6}$.0$^{2,7}$.0$^{9,11}$]tridec-4-oxyalkanediols, e.g., the 10-oxapentacyclo[6.3.1.1.$^{3,6}$.0$^{2,7}$.0$^{9,11}$]tridec-4-oxy-propanediols, The 10-oxapentacyclo[6.3.1.1$^{3,6}$.0$^{2,7}$.0$^{9,11}$]tridec-4-oxy-butanediols,
The 10-oxapentacyclo[6.3.1.1$^{3,6}$.0$^{2,7}$.0$^{9,11}$]tridec-4-oxy-pentanediols,
The 10-oxapentacyclo[6.3.1.1$^{3,6}$.0$^{2,7}$.0$^{9,11}$]tridec-4-oxy-hexanediols, and the like; the 10-oxapentacyclo[6.3.1.1$^{3,6}$.0$^{2,7}$.0$^{9,11}$]tridec-4-oxyalkanetriols, e.g.,
The 10-oxapentacyclo[6.3.1.1$^{3,6}$.0$^{2,7}$.0$^{9,11}$]tridec-4-oxy-butanetriols,
The 10-oxapentacyclo[6.3.1.1$^{3,6}$.0$^{2,7}$.0$^{9,11}$]tridec-4-oxy-pentanetriols,
The 10-oxapentacyclo[6.3.1.1$^{3,6}$.0$^{2,7}$.0$^{9,11}$]tridec-4-oxy-hexanetriols,
The 10-oxapentacyclo[6.3.1.1$^{3,6}$.0$^{2,7}$.0$^{9,11}$]tridec-4-oxy-octanetriols,
The 10-oxapentacyclo[6.3.1.1$^{3,6}$.0$^{2,7}$.0$^{9,11}$]tridec-4-oxy-nonanetriols, and the like; the 10-oxapentacyclo[6.3.1.1$^{3,6}$.0$^{2,7}$.0$^{9,11}$]tridec-4-oxyalkanetetrols, e.g.,
The 10-oxapentacyclo[6.3.1.1.$^{3,6}$.0$^{2,7}$.0$^{9,11}$]tridec-4-oxy-hexanetetrols, and the like; the 10-oxapentacyclo-[6.3.1.1$^{3,6}$.0$^{2,7}$.0$^{9,11}$]tridec-4-oxyalkanepentols; and the like.

Typical 10-oxapentacyclo[6.3.1.1$^{3,6}$.0$^{2,7}$.0$^{9,11}$]tridec-4-ylmethyleneoxyalkanols include, among others, 10-oxapentacyclo[6.3.1.1$^{3,6}$.0$^{2,7}$.0$^{9,11}$]tridec-4-ylmethylene-oxy-n-pentanol,
10-oxapentacyclo[6.3.1.1$^{3,6}$.0$^{2,7}$.0$^{9,11}$]tridec-4-ylmethyleneoxyethanol,
10-oxapentacyclo[6.3.1.1$^{3,6}$.0$^{2,7}$.0$^{9,11}$]tridec-4-ylmethylene-oxy-n-propanol,
10-oxapentacyclo[6.3.1.1$^{3,6}$.0$^{2,7}$.0$^{9,11}$]tridec-4-ylmethyleneoxyisopropanol,
10-oxapentacyclo[6.3.1.1$^{3,6}$.0$^{2,7}$.0$^{9,11}$]tridec-4-ylmethylene-oxy-n-butanol,
10-oxapentacyclo[6.3.1.1$^{3,6}$.0$^{2,7}$.0$^{9,11}$]tridec-4-ylmethylene-oxy-t-butanol,
10-oxapentacyclo[6.3.1.1$^{3,6}$.0$^{2,7}$.0$^{9,11}$]tridec-4-ylmethylene-oxy-n-hexanol,
10-oxapentacyclo[6.3.1.1$^{3,6}$.0$^{2,7}$.0$^{9,11}$]tridec-4-ylmethylene-oxy-n-octanol,
10-oxapentacyclo[6.3.1.1$^{3,6}$.0$^{2,7}$.0$^{9,11}$]tridec-4-ylmethylene-oxy-n-dodecanol, and the like.

Illustrative 10-oxapentacyclo[6.3.1.1$^{3,6}$.0$^{2,7}$.0$^{9,11}$]tridec-4-ylmethyleneoxyalkane-poly-ols which are contemplated include, for instance, the 10-oxapentacyclo-[6.3.1.1$^{3,6}$.0$^{2,7}$.0$^{9,11}$]tridec-4-ylmethyleneoxyalkanediols, e.g., The 10-oxapentacyclo[6.3.1.1$^{3,6}$.0$^{2,6}$.0$^{9,11}$]tridec-4-ylmethyleneoxypropanediols,
The 10-oxapentacyclo[6.3.1.1$^{3,6}$.0$^{2,7}$.0$^{9,11}$]tridec-4-ylmethyleneoxybutanediols,
The 10-oxapentacyclo[6.3.1.1$^{3,6}$.0$^{2,7}$.0$^{9,11}$]tridec-4-ylmethyleneoxypentanediols,
The 10-oxapentacyclo[6.3.1.1$^{3,6}$.0$^{2,7}$.0$^{9,11}$]tridec-4-ylmethyleneoxyhexanediols,
The 10-oxapentacyclo[6.3.1.1$^{3,6}$.0$^{2,7}$.0$^{9,11}$]tridec-4-yl-methyleneoxyoctanediols, and the like; the 10-oxapentacyclo[6.3.1.1$^{3,6}$.0$^{2,7}$.0$^{9,11}$]tridec-4-ylmethyleneoxyalkanetriols, e.g.,
The 10-oxapentacyclo[6.3.1.1$^{3,6}$.0$^{2,7}$.0$^{9,11}$]tridec-4-ylmethyleneoxybutanetriols,
The 10-oxapentacyclo[6.3.1.1$^{3,6}$.0$^{2,7}$.0$^{9,11}$]tridec-4-ylmethyleneoxypentanetriols, The 10-oxapentacyclo[6.3.1.1$^{3,6}$.0$^{2,7}$.0$^{9,11}$]tridec-4-ylmethyleneoxyhexanetriols,
The 10-oxapentacyclo[6.3.1.1$^{3,6}$.0$^{2,7}$.0$^{9,11}$]tridec-4-ylmethyleneoxyoctanetriols,
The 10-oxapentacyclo[6.3.1.1$^{3,6}$.0$^{2,7}$.0$^{9,11}$]tridec-4-yl-methyleneoxynonanetriols, and the like; the 10-oxapentacyclo[6.3.1.1$^{3,6}$.0$^{2,7}$.0$^{9,11}$]tridec-4-ylmethyleneoxyalkanetetrols, e.g., the 10-oxapentacyclo[6.3.1.1$^{3,6}$.0$^{2,7}$.0$^{9,11}$]tridec-4-ylmethyleneoxyhexanetetrols, and the like; the 10-oxapentacyclo[6.3.1.1$^{3,6}$.0$^{2,7}$.0$^{9,11}$]tridec-4-ylmethyleneoxyalkanepentols; and the like.

The 10-oxapentacyclo[6.3.1.1$^{3,6}$.0$^{2,7}$.0$^{9,11}$]tridec-4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol, 10-oxapentacyclo[6.3.1.1$^{3,6}$.0$^{2,7}$.0$^{9,11}$]tridec-4,5-ylene-diethanol, and the like.

Illustrative mono vicinal-alkanols, mono vicinal-epoxycycloalkanols, mono vicinal-epoxycycloalkylalkanols, and mono vicinal-epoxybicycloalkanols include, for instance, 2,3-epoxybutanol, 2,3-epoxyhexanol, 4,5-epoxyhexanol, 5,6-epoxydodecanol, 3,4-epoxyoctadecanol, 8,9-epoxyeicosanol, 2,3-epoxycyclopentanol, 3,4-epoxycyclopentanol, 2,3-epoxycyclohexanol, 3,4-epoxycyclohexanol, lower alkyl substituted-2,3-epoxycyclopentanol, lower alkyl substituted-2,3-epoxycyclohexanol, 3,4-epoxycycloheptanol, 2,3-epoxycyclopentylmethanol, 2,3-epoxycyclohexylmethanol, 3,4-epoxycyclohexylpropanol, 3-oxatricyclo[3.2.1.0$^{2,4}$]octan-6-ol, 3-oxatricyclo[3.2.1.0$^{2,4}$]octane-6,7-diol, lower alkyl substituted-3-oxatricyclo[3.2.1.0$^{2,4}$]octan-6-ol, and the like. It is pointed out that the expression "lower alkyl," as used herein, refers to a monovalent saturated aliphatic hydrocarbon radical which contains from 1 to 4 carbon atoms.

The preparation of 4-oxatetracyclo[6.2.1.0$^{2,7}$.0$^{3,5}$]undecan-9-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product. Epoxidation of the resulting olefinically unsaturated alcohol product results in 4-oxatetracyclo[6.2.1.0$^{2,7}$.0$^{3,5}$]undecan-9-ol. It is pointed out at this time that the epoxidation reaction of the olefinically unsaturated alcohol precursors which result in the monoepoxy alcohol compounds that are employed as a component(s) in the novel curable systems of the invention will be described in detail at a later section of the specification.

The preparation of 4-oxatetracyclo[6.2.1.0$^{2,7}$.0$^{3,5}$]undec-9-oxyalkanol, 4-oxatetracyclo[6.2.1.0$^{2,7}$.0$^{3,5}$]undec-9-oxyalkane-poly-ol, 10-oxapentacyclo[6.3.1.1$^{3,6}$.0$^{2,7}$.0$^{9,11}$]tridec-4-oxyalkanol, or 10-oxapentacyclo[6.3.1.1$^{3,6}$.0$^{2,7}$.0$^{9,11}$]tridec-4-oxyalkane-poly-ol is accomplished, for example, by reacting a molar excess of a polyhydric alcohol, e.g., ethylene glycol, glycerol, 1,2,6-hexanetriol, erythritol, pentaerythritol, and the like, with dicyclopentadiene or tetracyclo[6.2.1.1$^{3,6}$.0$^{2,7}$]dodeca-4,9-diene, in the presence of boron trifluoride catalyst, at an elevated temperature, e.g., from about 50° C., and lower, to about 125° C., and higher, and for a period of time to produce tricyclo[5.2.1.0$^{2,6}$]dec-3-en-8-oxyalkanol, tricyclo[5.2.1.0$^{2,6}$]dec-3-en-8-oxyalkane-poly-ol, tetracyclo[6.2.1.1$^{3,6}$.0$^{2,7}$]dodec-9-en-4-oxyalkanol, or tetracyclo[6.2.1.1$^{3,6}$.0$^{2,7}$]dodec-9-en-4-oxyalkane-poly-ol as the product. Epoxidation of the resulting product gives the mono epoxy alcohol compounds under consideration.

The preparation of 4-oxatetracyclo[6.2.1.0$^{2,7}$.0$^{3,5}$]undecane-9,10-diol or 10-oxapentacyclo[6.3.1.1$^{3,6}$.0$^{2,7}$.0$^{9,11}$]tridecane-4,5-diol is effected, for example, by reacting dicyclopentadiene or tetracyclo[6.2.1.1$^{3,6}$.0$^{2,7}$]dodeca-4,9-diene with aqueous hydrogen peroxide (equimolar concentration), in the presence of osmium tetroxide catalyst, at an elevated temperature, and for a period of time sufficient to produce tricyclo[5.2.1.$0^{2,6}$]dec-3-ene-8,9-diol or tetracyclo[6.2.1.$1^{3,6}$.$0^{2,7}$]dodec-9-ene-4,5-diol as the product. Epoxidation of the resulting product produces the mono epoxy alcohol compound.

Monomeric 4-oxatetracyclo[6.2.1.$0^{2,7}$.$0^{3,5}$]undecane-10, 11-diol can be prepared by the reaction of dicyclopentadiene and lead tetraacetate, under the influence of heat, to yield tricyclo[5.2.1.$0^{2,6}$]dec-3-ene-9,10-diol, followed by epoxidizing said diol to obtain the mono epoxy alcohol compound in question.

The preparation of 10-oxapentacyclo[6.3.1.$1^{3,6}$.$0^{2,7}$.$0^{9,11}$]tridecan-4-ol is as follows: The Diels-Alder reaction of equimolar quantities of cyclopentadiene and vinyl acetate results in 4-acetoxy-bicyclo[2.2.1]hept-2-ene. Subsequent reaction of the bicyclo product with cyclopentadiene yields 4-acetoxy-tetracyclo[6.2.1.$1^{3,6}$.$0^{2,7}$]dodec-9-ene. The reaction of the tetracyclo product with potassium hydroxide yields tetracyclo[6.2.1.$1^{3,6}$.$0^{2,7}$]dodec-9-en-4-ol which can be epoxidized to give the mono epoxy alcohol compound under discussion.

The preparation of 10-oxapentacyclo[6.3.1.$1^{3,6}$.$0^{2,7}$.$0^{9,11}$]tridec-4-ylmethyleneoxyalkanol,
10-oxapentacyclo[6.3.1.$1^{3,6}$.$0^{2,7}$.$0^{9,11}$]tridec-4-ylmethyleneoxyalkane-poly-ol,
10-oxapentacyclo[6.3.1.$1^{3,6}$.$0^{2,7}$.$0^{9,11}$]tridec-4-ylalkanol, or
10-oxapentacyclo[6.3.1.$1^{3,6}$.$0^{2,7}$.$0^{9,11}$]tridec-4,5-ylene-dialkanol, also, can be prepared via the Diels-Alder synthesis route, followed by epoxidizing the Diels-Alder product. For instance, the reaction of at least two mols of cyclopentadiene with one mol of alkenol, allyl hydroxyalkyl ether, allyl polyhydroxyalkyl ether, or alkenediol will yield tetracyclo[6.2.1.$1^{3,6}$.$0^{2,7}$]dodec-9-en-4-ylalkanol,
tetracyclo[6.2.1.$1^{3,6}$.$0^{2,7}$]dodec-9-en-4-ylmethyleneoxyalkanol,
tetracyclo[6.2.1.$1^{3,6}$.$0^{2,7}$]dodec-9-en-4-ylmethyleneoxyalkane-poly-ol, or
tetracyclo[6.2.1.$1^{3,6}$.$0^{2,7}$]dodec-9-en-4,5-ylenedialkanol, respectively. Epoxidation of these olefinically unsaturated alcohol precursors will produce the mono epoxy alcohol compounds under consideration.

The 4-oxatetracyclo[6.2.1.$0^{2,7}$.$0^{3,5}$]undec-9-oxy(mono- and polyalkyleneoxy)alkanols can be prepared by reacting one mol of tricyclo[5.2.1.$0^{2,6}$]dec-3-en-8-ol with at least two mols and upwards to 100 mols, or more, of a saturated aliphatic mono vicinal-epoxyhydrocarbon (hereinafter termed "olefin oxide"), e.g., ethylene oxide, 1,2-epoxypropane, 1,2-epoxybutane, 2,3-epoxybutane, styrene oxide, 1,2-epoxyoctane, 1,2-epoxydodecane, 1,2-epoxyoctadecane, 1-phenyl-2,3-epoxybutane, 1 - cyclohexyl-2,3-epoxypentane, and the like; in the presence of an alkali metal hydroxide catalyst, e.g., about 0.1 weight percent potassium hydroxide, based on the total weight of the reactants; under essentially anhydrous conditions; and at an elevated temperature, e.g., from about 90° C., and lower, to about 140° C., and higher. If desired, the reaction product mixture can be purified by washing with water or an aqueous acetic acid solution to remove or neutralize the residual catalyst. The resulting product, ie., tricyclo[5.2.1.$0^{2,6}$]dec - 3 - en - 8-oxy(mono- or polyalkyleneoxy)alkanol, then can be reacted with an epoxidizing agent to yield the monoepoxy alcohol compound. The following structural formula characterizes the 4-oxatetracyclo[6.2.1.$0^{2,7}$.$0^{3,5}$]undec - 9 - oxy(mono- and polyalkyleneoxy)alkanols:

I

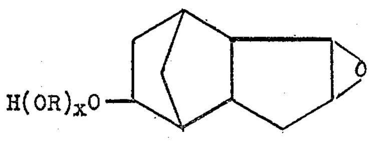

wherein $x$ is a number having an average value of at least 2 (and upwards to 100, and greater), and wherein R is a divalent saturated aliphatic hydrocarbon radical. It is to be noted that $x$ has an average value since the epoxy alcohol product which results from the reaction is not composed of discrete, identical molecules, but rather, the product is composed of molecules in which the value for $x$ can vary over a broad range.

The 4 - oxatetracyclo[6.2.1.$0^{2,7}$.$0^{3,5}$]undec-9,10-ylenedi[oxy(mono- and polyalkyleneoxy)alkanols] can be prepared by reacting one mol of tricyclo[5.2.1.$0^{2,6}$]dec-3-ene-8,9-diol with at least 4 mols of an olefin oxide, followed by epoxidation, in the manner explained supra. These monoepoxy alcohols can be characterized as follows:

II

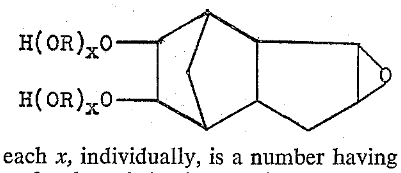

wherein each $x$, individually, is a number having an average value of at least 2 (and upwards to 100 and greater), and wherein R is a divalent saturated aliphatic hydrocarbon radical.

The 4 - oxatetracyclo[6.2.1.$0^{2,7}$.$0^{3,5}$]undec-10,11-ylenedi[oxy(mono- and polyalkyleneoxy)alkanols] can be prepared by the reaction of one mol of tricyclo[5.2.1.$0^{2,6}$]dec-3-ene-9,10-diol with at least 4 mols of an olefin oxide, followed by epoxidation, in the manner explained supra. These monoepoxy alcohols have the following structural formula:

III

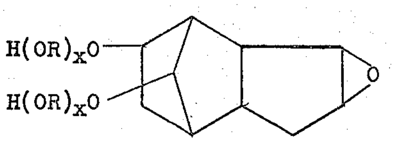

wherein $x$ and R have the values set forth in Formula II supra.

The 10 - oxapentacyclo[6.3.1.$1^{3,6}$.$0^{2,7}$.$0^{9,11}$]tridec - 4-oxy(mono- and polyalkyleneoxy)alkanols are prepared by reacting one mol of tetracyclo[6.2.1.$1^{3,6}$.$0^{2,7}$]dodec-9-en-4-ol with at least 2 mols of an olefin oxide, followed by epoxidation, in the manner explained supra. These monoepoxy alcohols are characterized by the following structural formula:

IV

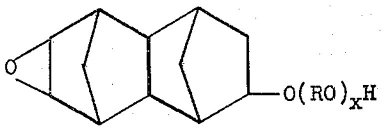

wherein $x$ and R have the values set forth in Formula II supra.

The 10 - oxapentacyclo[6.3.1.$1^{3,6}$.$0^{2,7}$.$0^{9,11}$]tridec - 4,5-ylene-di[oxy(mono- and polyalkyleneoxy)alkanols] are prepared by the reaction of at least 4 mols of an olefin oxide per mol of tetracyclo[6.2.1.$1^{3,6}$.$0^{2,7}$]dodec - 9 - ene-4,5-diol, followed by epoxidation, in the manner explained supra. The resulting monoepoxy alcohols are thusly characterized:

V

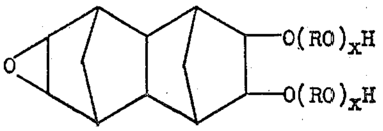

wherein $x$ and R have the values set forth in Formula II supra.

The 10-oxapentacyclo$[6.3.1.1^{3,6}.0^{2,7}.0^{9,11}]$tridec-4-ylalkyleneoxyalkanols can be prepared by the reaction of equivolar quantities of tetracyclo$[6.2.1.1^{3,6}.0^{2,7}]$dodec-9-en-4-ylalkanol and an olefin oxide, followed by epoxidation, in the manner explained supra. These monoepoxy alcohols have the following formula:

VI

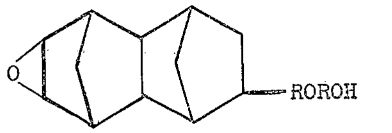

wherein each R can be the same or different divalent saturated aliphatic hydrocarbon radicals.

The 10-oxapentacyclo$[6.3.1.1^{3,6}.0^{2,7}.0^{9,11}]$tridec-4-ylalkyleneoxy(mono- and polyalkyleneoxy)alkanols can be prepared by the reaction of at least 2 mols of an olefin oxide per mol of tetracyclo$[6.2.1.1^{3,6}.0^{2,7}]$dodec-9-en-4-ylalkanol, then epoxidizing, in the manner explained supra. The following structural formula illustrates these monoepoxy alcohol compounds:

VII

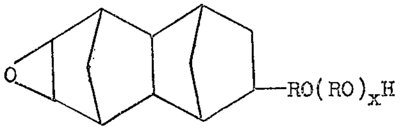

wherein each R, individually, is a divalent saturated aliphatic hydrocarbon radical, and wherein $x$ is a number having an average value of at least 2.

The 10 - oxapentacyclo$[6.3.1.1^{3,6}.0^{2,7}.0^{9,11}]$tridec - 4,5-ylene-di(alkyleneoxyalkanols) are obtained by reacting two mols of an olefin oxide per mol of tetracyclo $[6.2.1.1^{3,6}.0^{2,7}]$dodec - 9 - en-4,5-ylene-dialkanol, followed by epoxidation, in the manner explained supra. The following formula characterizes the monoepoxy alcohols under consideration:

VIII

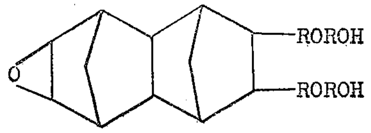

wherein each R can be the same or different divalent saturated aliphatic hydrocarbon radicals.

The 10 - oxapentacyclo$[6.3.1.1^{3,6}.0^{2,7}.0^{9,11}]$tridec - 4,5-ylene-di[alkyleneoxy(mono- and polyalkyleneoxy)alkanols] are prepared by the reaction of at least 4 mols of an olefin oxide per mol of tetracyclo$[6.2.1.1^{3,6}.0^{2,7}]$dodec-9-en-4,5-ylene-dialkanol, followed by epoxidation, in the manner explained supra. The following structural formula illustrates the monoepoxy alcohols under discussion:

IX

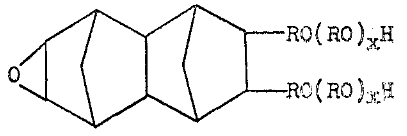

wherein each R, individually, is a divalent saturated aliphatic hydrocarbon radical, and wherein $x$ is a number having an average value of at least 2.

It is to be understood that the oxymethyleneoxy radical, i.e., —$OCH_2O$—, is not encompassed within the scope of the monoepoxy alcohol compounds which are employed in the curable systems.

The monoepoxy alcohol compounds can be prepared by the reaction of the corresponding olefinically unsaturated alcohol precursor with an epoxidizing agent. Among the epoxidizing agents contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, peroctanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably from about 20° to about 80° C. Theoretically, to effect complete epoxidation of the olefinically unsaturated alcohol precursor, equimolar quantities of peracid and precursor should be employed. However, since some degradation of the peracid occurs during the epoxidation reaction, it is desirable to employ a quantity of peracid in excess of that theoretically required to effect essentially complete epoxidation of said precursor, e.g., from about 1.1 to about 10, and higher, mols of peracid per mol of precursor. The epoxidation reaction is conducted for a period of time sufficient to introduce oxirane oxygen at the site of the carbon to carbon double bond present in the precursor, e.g., from several minutes to several hours. Periodic analysis of samples of the reaction mixture to determine the quantity of peracid consumed during the epoxidation reaction can be readily performed by the operator by well established techniques and procedures. At the termination of the epoxidation reaction, any unreacted olefinic precursor, acid by-product, inert vehicle, if employed, and the like, can be recovered from the reaction product mixture, for example, by distillation under reduced pressure. Further well known purification techniques can be employed, as desired.

The olefinically unsaturated polycarboxylic acid anhydrides which are contemplated include those aliphatic, cycloaliphatic, and aromatic acid anhydrides which contain at least one polymerizable ethylenic group. The preferred anhydrides are the mono-olefinically unsaturated hydrocarbon dicarboxylic acid anhydrides. Illustrative anhydrides include, for example, tetrahydrophthalic anhydride, maleic anhydride, chloromaleic anhydride, dichloromaleic anhydride, citraconic anhydride, isocitraconic anhydride, itaconic anhydride, nonenylsuccinic anhydride, octenylsuccinic anhydride, pentenylsuccinic anhydride, lower alkyl substituted-bicyclo[2.2.1]hept-5-ene-2,3-dicarboxylic anhydride, methylbicyclo[2.2.1]hept-5-ene-2,3 - dicarboxylic anhydride, and the like. Mixtures of polycarboxylic acid anhydrides can be employed. Maleic anhydride is preferred.

It is pointed out at this time that the most desirable and preferred aspects of the invention contemplate the use of an olefinically unsaturated polycarboxylic acid anhydride as an essential component in the curable formulations. However, mixtures of olefinically unsaturated polycarboxylic acids, also, can be employed. Moreover, the polycarboxylic acid anhydride component can be replaced in toto by the polycarboxylic acid component. Among the olefinically unsaturated polycarboxylic acids (including the polycarboxy polyesters) contemplated are those illustrated in United States Patent No. 2,934,508 which are hereby incorporated by reference. If desired, polyols such as those illustrated in United States Patent No. 2,890,196 can be incorporated into the novel curable compositions.

The monomeric ethylenically unsaturated compounds contemplated in the curable systems are those which contain a polymerizable ethylenic bond. It is preferred that that monomeric ethylenically unsaturated compounds contain no functional groups, other than the polymerizable ethylenic group(s), which are reactive with vicinal epoxy groups or carboxy groups. Illustrative monomeric ethylenically unsaturated compounds include, for example, the mono- and polyolefinic hydrocarbons, e.g., isoprene, the heptenes, the octenes, the nonenes, butadiene, pentadiene, hexadiene, heptadiene, octadiene, cyclopentene, cyclohexene, cycloheptene, lower alkyl substituted-cyclohexene, lower alkyl substituted-cyclopentene, ethylcyclohexene, n-propylcycloheptene, styrene, alkylstyrene, chlorostyrene, ethylstyrene, dimethylstyrene, isopropylstyrene, divinylbenzene, and the like; the olefinic esters and ethers, e.g., divinyl ether, diallyl ether, di(2-butenyl)ether, di(2-pentenyl) ether, vinyl allyl ether, vinyl isobutyl ether, methyl acrylate, methyl crotonate, methyl methacrylate, ethyl acrylate, ethyl crotonate, ethyl methacrylate, propyl acrylate, propyl crotonate, propyl methacrylate, allyl crotonate, allyl acrylate, allyl methacrylate, allyl butyrate, allyl 2-ethylhexanoate, vinyl benzoate, allyl benzoate, diallylphthalate, methyl linoleate, ethyl linolenate, alkyl methacrylate, alkyl crotonate, alkyl oleate, and the like; the olefinic monocarboxylic acids, e.g., acrylic acid, crotonic acid, methacrylic acid, and the like. Other monomeric ethylenically unsaturated compounds include, for example, triallyl cyanurate, triallylamine, vinyl chloride, acrylonitrile, and the like. The mono- and polyallyl ethers, the mono- and polyallyl esters, and the alkyl acrylates are preferred. Specific examples of highly preferred monomeric ethylenically unsaturated compounds include, among others, diallyl phthalate, triallyl cyanurate, ethyl acrylate, styrene, and methyl methacrylate. Styrene is most preferred.

One embodiment of the invention is directed to curable and partially cured composition (fusible thermosetting intermediate reaction products that are viscous liquids or solids) comprising monoepoxy alcohol, olefinically unsaturated polycarboxylic acid anhydride, and monomeric ethylenically unsaturated compound, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In the following illustrative examples, Barcol hardness values were determined by the use of Barcol Impressor GYZJ-934-1 at a temperature of about 24° C. Unless otherwise indicated, the examination or description of the resins were conducted at room temperature, i.e., about 24° C.

EXAMPLE 1

The compound, tricyclo[5.2.1.0$^{2,6}$]dec-3-en-8-oxyethanol, was prepared by the reaction of ethylene glycol with tricyclo[5.2.1.0$^{2,6}$]deca-3,8-diene in the presence of boron trifluoride catalyst. To 833 grams (4.29 mols) of tricyclo[5.2.1.0$^{2,6}$]dec-3-en-8-oxyethanol maintained at about 40° C., there was added, dropwise, over a period of 3 hours, with stirring, 1,340 grams of a 26.8 weight percent solution of peracetic acid in ethyl acetate. The reaction was exothermic and consequently, the reaction vessel was occasionally cooled with ice. The resulting admixture was maintained at about 40° C. for an additional 3 hours plus standing overnight at room temperature, i.e., about 24° C. for about 15 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 869 grams of a colorless liquid, i.e., 4-oxatetracyclo-[6.2.1.0$^{2,7}$.0$^{3,5}$]undec-9-oxyethanol, which had the following properties:

Boiling point, 134°–135° C./0.35 mm. of Hg.
$n_D^{30}$, 1.5095.

| Elemental Analysis | Found (percent) | Calculated (percent) |
|---|---|---|
| Carbon | 68.44 | 68.54 |
| Hydrogen | 8.56 | 8.63 |

The yield was 96 percent.

EXAMPLE 2

The compound, tricyclo[5.2.1.0$^{2,6}$]dec-3-en-8-ol, was prepared by the reaction of tricyclo[5.2.1.0$^{2,6}$]deca-3,8-diene in ae presence of an aqueous solution of sulfuric acid under the influence of heat. To 150 grams (1 mol) of tricyclo[5.2.1.0$^{2,6}$]dec-3-en-8-ol maintained at about 45°–50° C., there was added, dropwise, over a period of 55 minutes, with stirring, 308 grams of a 27.2 weight percent solution of peracetic acid in ethyl acetate. The resulting admixture then was maintained at about 45°–50° C. for an additional 2.25 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 164 grams of a colorless liquid, i.e., 4-oxatetracyclo[6.2.1.0$^{2,7}$.0$^{3,5}$]-undecan-9-ol which had the following properties.

Boiling point ---------- 130°–134° C./2.5 mm. of Hg.
$n_D^{30}$ ------------------ 1.5205.
Analysis for epoxide ---- 96.9 percent.

EXAMPLE 3

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of cyclopentadiene and vinyl acetate. To 176 grams of tetracyclo[6.2.1.1$^{3,6}$.0$^{2,7}$]dodec-9-en-4-ol, there is added 0.2 gram of potassium hydroxide, followed by heating the resulting admixture to about 100°–12° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4-oxyethanol, is dried at an elevated temperature under reduced pressure.

EXAMPLE 4

To a mixture of 200 grams of tetracyclo[6.2.1.1$^{3,6}$.0$^{2,7}$]-dodec-9-en-4-oxyethanol and 100 grams of ethyl acetate, there is added under stirring, dropwise, 278 grams of a 27.4 weight percent solution of peracetic acid in ethyl acetate. The reaction is exothermic and consequently, the reaction temperature is controlled at about 45° C. by the rate of addition. After 2.5 hours at this temperature, the reaction is essentially complete. The volatiles, acetic acid by-product, ethyl acetate, etc., are removed by co-distillation with ethylbenzene under reduced pressure. After stripping under high vacuum at about 100° C., there is obtained a yellow, viscous liquid product, i.e., 10-oxapentacyclo[6.3.1.1$^{3,6}$.0$^{2,7}$.0$^{9,11}$]tridec-4 - oxyethanol. The infrared spectrum discloses the presence of epoxide and hydroxyl groups.

EXAMPLE 5

The compound, tetracyclo[6.2.1.1$^{3,6}$.0$^{2,7}$]dodec-9-en-4-ylmethanol (boiling point of 100° C. at 0.5 mm. of Hg, and $n_D^{30}$ of 1.5362), is prepared via the Diels-Alder synthesis of cyclopentadiene and allyl alcohol. To 190 grams of tetracyclo[6.2.1.1$^{3,6}$.0$^{2,7}$]dodec-9-en-4-ylmethanol, there is added 0.2 gram of potassium hydroxide, followed by heating the resulting admixtures to about 115°–130° C. with stirring. Ethylene oxide is fed into the stirred reaction mixture through a diffuser (below the liquid level) until the weight thereof increases by 43 grams. Then the resulting reaction product mixture is cooled, washed twice with ice water, and dried by heating to about 110° C. under a reduced pressure of 2 mm. of Hg. The resulting product, i.e., tetracyclo[6.2.1.1$^{3,6}$.0$^{2,7}$]dodec-9-en-4-ylmethyleneoxyethanol, is employed in Example 6 to follow.

EXAMPLE 6

To a mixture of 210 grams of tetracyclo[6.2.1.1$^{3,6}$.0$^{2,7}$]-dodec-9-en-4-ylmethyleneoxyethanol and 100 grams of ethyl acetate, there is added under stirring, dropwise, 330 grams of a 23 weight percent solution of peracetic acid in ethyl acetate. The reaction is exothermic and consequently, the reaction temperature is controlled to about 40°–50° C. by the rate of addition during the initial stage, and by mild heating in the latter stage. After 3 hours at this temperature, the reaction is essentially complete. The volatiles, acetic acid by-product, ethyl acetate, etc., are removed by co-distillation with ethyl benzene under reduced pressure. After stripping under high vacuum at about 110° C., there is obtained a yellow, viscous liquid product. The product, 10-oxapentacyclo

[6.3.1.1$^{3,6}$.0$^{2,7}$.0$^{9,11}$]

tridec-4-ylmethyleneoxyethanol, is identified by its infrared spectrum.

EXAMPLE 7

A. Tricyclo[5.2.1.0$^{2,6}$]dec - 3-ene-9,10-diol (melting point of 90° C.) is prepared by the saponification of the recation product of dicyclopentadiene and lead tetraacetate. To a reaction vessel which contains 42 grams of the above said diol admixture and 42 grams of ethyl acetate maintained with stirring at about 30° C., there is added, dropwise, over a period of one hour 76 grams of a 26.5 weight percent solution of peracetic acid in ethyl acetate. The resulting solution is maintained at 30° C. for an additional 5 hours. The reaction is essentially complete as indicated by titration for peracetic acid. The volatile materials, i.e., ethyl acetate, acetic acid by-product, etc., are removed by co-distillation with ethyl-benzene. The residue product, thus obtained, solidifies on standing and comprises a mixture of 4-oxatetracyclo [6.2.1.0$^{2,7}$.0$^{3,5}$]undecane-10,11-diol.

B. In an analogous manner as above, tricyclo-

[5.2.1.0$^{2,6}$]undec-3-ene-8,9-diol (which is prepared by the reaction of equimolar quantities of dicyclopentadiene and hydrogen peroxide in the presence of osmium tetroxide) is reacted with a solution of peracetic acid in ethyl acetate, to yield 4-oxatetracyclo[6.2.1.0$^{2,7}$.0$^{3,5}$]undecane-9,10-diol.

EXAMPLE 8

To a reaction vessel which contains 45 grams of ethyl acetate and 44 grams of tetracyclo[6.2.1.1$^{3,6}$.0$^{2,7}$]dodec-9-en-4,5-ylene-dimethanol (a white solid which is isolated from high boiling fractions, i.e., 140°–180° C./0.5 mm. of Hg, resulting from the Diels-Alder synthesis of cyclopentadiene and 2-butene-1,4-diol), maintained at about 30° C. with stirring, there is added, dropwise, over a period of one hour 42 grams of a 26 weight percent solution of peracetic acid in ethyl acetate. The resulting solution is maintained at 30° C. for an additional 5.5 hours to ensure completion of the reaction. The volatile materials, i.e., ethyl acetate, acetic acid by-product, etc., are removed by co-distillation with ethylbenzene. The residue product, thus obtained, solidifies on standing and is identified as 10-oxapentacyclo[6.3.1.1$^{3,6}$.0$^{2,7}$.0$^{9,11}$]tridec-4,5-ylene-dimethanol by its infrared absorption spectrum.

EXAMPLE 9

To a reaction vessel which contains 40 grams of ethyl acetate and 40 grams of tetracyclo[6.2.1$^{3,6}$.0$^{2,7}$]dodec-9-ene-4,5-diol (which is prepared by the reaction of equimolar quantities of tetracyclo[6.2.1.1$^{3,6}$.0$^{2,7}$]dodeca-4,9-diene and hydrogen peroxide in the presence of osmium tetroxide) maintained at about 30° C. with stirring, there is added, dropwise, over a period of 1.5 hours 42 grams of a 26 weight percent solution of peracetic acid in ethyl acetate, The resulting solution is maintained at 30° C. for an additional 6 hours. At the end of this period of time the reaction is essentially complete as indicated by titration for peracetic acid. The volatile materials, i.e., ethyl acetate, acetic acid by-product, etc., are removed by co-distillation with ethylbenzene. The solid residue product, thus obtained, is identified as 10-oxapentacyclo[6.3.1.1$^{3,6}$.0$^{2,7}$.0$^{9,11}$]tridecane - 4,5 - diol by its infrared absorption spectrum.

EXAMPLE 10

To 62 grams of tetracyclo[6.2.1.1$^{3,6}$.0$^{2,7}$]dodec-9-en-4-ol (melting point of 87°–88° C.; prepared by the saponification of the reaction product obtained by the Diels-Alder synthesis of cyclopentadiene and vinyl acetate) and 24 grams of ethyl acetate, maintained at about 50°–55° C., there was added to the resulting solution, dropwise, 120 grams of a 28.6 weight percent solution of peracetic acid in ethyl acetate over a period of 35 minutes. After an additional 2 hours at about 50°–55° C., the amount of peracetic acid consumed was 97.7% of the theoretical. The volatiles were removed from the reaction product mixture by co-distillation with ethylbenzene. There was obtained 77 grams of a viscous liquid product identified as 10-oxapentacyclo[6.3.1.1$^{3,6}$.0$^{2,7}$.0$^{9,11}$]tridecan-4-ol.

EXAMPLE 11

To 150 grams of tetracyclo[6.2.1.1$^{3,6}$.0$^{2,7}$]dodec-9-en-4-ylmethanol (boiling point of 100° C./0.5 mm. of Hg and $n_D^{30}$ of 1.5362; prepared by the Diels-Alder synthesis of cyclopentadiene and allyl alcohol) which was maintained with stirring at about 50°–55° C., there was added, dropwise, 232 grams of a 28.6 weight percent solution of peracetic acid in ethyl acetate over a period of 70 minutes. After an additional one hour at about 50°–55° C., the amount of peracetic acid consumed was 98.5 percent of the theoretical. The volatiles were removed from the reaction product mixture by co-distillation with ethyl-benzene. There was obtained 177 grams of a viscous product containing 10-oxapentacyclo

[6.3.1.1$^{3,6}$.0$^{2,7}$.0$^{9,11}$]tridec-4-ylmethanol

EXAMPLE 12

To a reaction vessel which contains 112 grams of tricyclo[5.2.1.0$^{2,6}$]dec-3-en-8 - oxypropanediol (boiling point of 175°–180° C. and $n_D^{25}$ of 1.5186; prepared by the boron trifluoride-catalyzed addition of glycerol to dicyclopentadiene under the influence of heat), maintained at about 30° C. with stirring, there is added, dropwise, 168 grams of a 25 weight percent solution of peracetic acid in ethyl acetate over a period of about 1.5 hours.

After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethyl-benzene. The viscous liquid product, thus obtained, is identified as 4-oxatetracyclo$[6.2.1.0^{2,7}.0^{3,5}]$undec-9-oxy-propanediol (or glycerol mono-4-oxatetracyclo $[6.2.1.0^{2,7}.0^{3,5}]$undec-9-enyl ether) by inspection of its infrared absorption spectrum.

EXAMPLE 13

To a reaction vessel which contains 800 grams of tricyclo$[5.2.1.0^{2,6}]$dec-3-en-8-oxy-n-butanol (which results from the boron trifluoride catalyzed addition of 1,4-butanediol to tricyclo$[5.2.1.0^{2,6}]$deca-3,8-diene under the influence of heat), maintained at about 30° C. with stirring, there is added, dropwise, 1550 grams of a 26.2 weight percent solution of peracetic acid in ethyl acetate over a period of 4 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo$[6.2.1.0^{2,6}.0^{3,5}]$undec-9-oxy-n-butanol by inspection of its infrared absorption spectrum.

EXAMPLE 14

To a reaction vessel which contains 100 grams of ethyl acetate and 125 grams pentaerythritol mono-tricyclo$[5.2.1.0^{2,6}]$dec-3-en-8-yl ether (which results from the boron trifluoride-catalyzed addition of pentaerythritol to tricyclo$[5.2.1.0^{2,6}]$deca-3,8-diene under the influence of heat), maintained at about 30° C. with stirring, there is added, dropwise, 168 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as pentaerythritol mono - 4 - oxatetracyclo$[6.2.1.0^{2,7}.0^{3,5}]$undec-9-yl ether by inspection of its infrared absorption spectrum and analysis for the epoxide group.

EXAMPLE 15

To a reaction vessel which contains 76 grams of hexanetriol mono-tetracyclo$[6.2.1.1^{3,6}.0^{2,7}]$dodec-9 - en - 4-yl ether (which results from the boron trifluoride catalyzed addition of 1,2,6-hexanetriol to tetracyclo$[6.2.1.1^{3,6}.0^{2,7}]$dodeca-4,9-diene under the influence of heat), maintained at about 30° C. with stirring, there is added, dropwise, 84 grams of a 25 weight percent solution of peracetic acid in ethyl acetate over a period of 1.5 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as hexanetriol mono - 10 - oxapentacyclo$[6.3.1.1^{3,6}.0^{2,7}.0^{9,11}]$tridec-4-yl ether by inspection of its infrared absorption spectrum.

EXAMPLE 16

To a reaction vessel which contains 120 grams of glycerol mono - tetracyclo$[6.2.1.1^{3,6}.0^{2,7}]$dodec-9-en-4-yl ether (which results from the boron trifluoride catalyzed addition of glycerol to tetracyclo$[6.2.1.1^{3,6}.0^{2,7}]$dodeca-4,9-diene under the influence of heat), maintained at about 30° C. with stirring, there is added, dropwise, 165 grams of a 25.5 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as glycerol mono - 10 - oxapentacyclo$[6.3.1.1^{3,6}.0^{2,7}.0^{9,11}]$tridec-4-yl ether by inspection of its infrared absorption spectrum.

EXAMPLE 17

A. To a reaction vessel which contains 66 grams of glycerol mono-tetracyclo$[6.2.1.1^{3,6}.0^{2,7}]$dodec - 9 - en-4-ylmethyl ether (which results from the Diels-Alder synthesis of 2 mols of cyclopentadiene with one mol of glycerol monoallyl ether), maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as glycerol mono-10-oxapentacyclo$[6.3.1.1^{3,6}.0^{2,7}.0^{9,11}]$tridec-4-ylmethyl ether by inspection of its infrared absorption spectrum.

B. In an analogous manner as above, pentaerythritol mono - tetracyclo$[6.2.1.1^{3,6}.0^{2,7}]$dodec - 9 - en-4-ylmethyl ether (prepared from the Diels-Alder synthesis of 2 mols of cyclopentadiene with one mol of pentaerythritol monoallyl ether) is reacted with a solution of peracetic acid in ethyl acetate to give a viscous liquid product which is identified as petaerythritol mono - 10 - oxapentacyclo$[6.3.1.1^{3,6}.0^{2,7}.0^{9,11}]$tridec-4-ylmethyl ether by its infrared absorption spectrum.

EXAMPLE 18

To a reaction vessel which contains 140 grams of tetracyclo$[6.2.1.1^{3,6}.0^{2,7}]$dodec-9-en-4-ylethanol (which results from the Diels-Alder synthesis of 2 mols of cyclopentadiene and one mol of 1-buten-4-ol), maintained at about 50° C. with stirring, there is added, dropwise, 260 grams of a 25.5 weight percent solution of peracetic acid in ethyl acetate over a period of 2 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo$[6.3.1.1^{3,6}.0^{2,7}.0^{9,11}]$tridec - 4 - ylethanol by inspection of its infrared absorption spectrum.

EXAMPLE 19

The compound, tetracyclo$[6.2.1.1^{3,6}.0^{2,7}]$dodec-9-en-4-ol (melting point of 87°–88° C.), is prepared by the saponification of the reaction product obtained by the Diels-Alder synthesis of 2 mols of cyclopentadiene with one mol of vinyl acetate. To 88 grams of tetracyclo$[6.2.1.1^{3,6}.0^{2,7}]$dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 176 grams. Then the resulting reaction product mixture is cooled, followed by neutralizing the catalyst with acetic acid. The reaction product mixture is washed with aqueous solution of sodium chloride, and then washed with water. The product, a mixture of tetracyclo $[6.2.1.1^{3,6}.0^{2,7}]$ dodec-9-en-4-oxy(polyethyleneoxy)ethanols, is dried at an elevated temperature under reduced pressure.

EXAMPLE 20

To a reaction vessel which contains 200 grams of ethyl acetate and 200 grams of the mixture of tetracyclo-[6.2.1.1$^{3,6}$.0$^{2,7}$]dodec-9-en-4-oxy(polyethyleneoxy)ethanols which is prepared as explained in Example 19 supra and maintained at about 30° C. with stirring, there is added, dropwise, 350 grams of a 26.2 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as a mixture of 10-oxapentacyclo

[6.3.1.1$^{3,6}$.0$^{2,7}$.0$^{9,11}$]

tridec-4-oxy(polyethyleneoxy)ethanols.

EXAMPLE 21

To a reaction vessel which contains 160 grams of tricyclo[5.2.1.0$^{3,6}$.0$^{2,7}$.0$^{9,11}$]dec-3-en-8-ol, there is added 0.2 gram of potassium hydroxide, followed by heating the resulting admixture to about 120° C. with stirring. Ethylene oxide is fed into the stirred reaction mixture (below the liquid level) until the weight thereof increases by 240 grams. Then the resulting reaction product mixture is cooled, followed by neutralizing the catalyst with acetic acid. The reaction product mixture is washed with aqueous solution of sodium chloride, and then washed with water. The product, a mixture of tricyclo[5.2.1.0$^{2,6}$]dec-3-en-8-oxy(polyethyleneoxy)ethanols, is dried at an elevated temperature under reduced pressure.

EXAMPLE 22

To a reaction vessel which contains 250 grams of ethyl acetate and 300 grams of the mixture of tricyclo-[5.2.1.0$^{2,6}$]dec-3-en-oxy(polyethyleneoxy)ethanols which is prepared as explained in Example 21 supra and maintained at about 40° C. with stirring, there is added, dropwise, 600 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product thus obtained is identified as a mixture of 4-oxatetracyclo[6.2.1.0$^{2,6}$.0$^{3,5}$]undec-9-oxy(polyethyleneoxy)ethanols by inspection of its infrared absorption spectrum.

EXAMPLE 23

To a reaction vessel which contains 80 grams of tricyclo[5.2.1.0$^{2,6}$]dec-3-ene-8,9-diol, there is added 0.3 gram of potassium hydroxide, followed by heating the resulting admixture to about 120° C. with stirring. Ethylene oxide is fed into the stirred reaction mixture (below the liquid level) until the weight thereof increases by 330 grams. Then the resulting reaction product mixture is cooled, followed by neutralizing the catalyst with acetic acid. The reaction product mixture is washed twice with aqueous solution of sodium chloride, and then washed with water. The product, a mixture of tricyclo[5.2.1.0$^{2,6}$]dec-3-en-8,9-ylene-di[oxy(polyethyleneoxy)ethanols], is dried at an elevated temperature under reduced pressure.

EXAMPLE 24

To a reaction vessel which contains 110 grams of ethyl acetate and 110 grams of the mixture of tricyclo [5.2.1.0$^{2,6}$]dec-3-en-8,9-ylene-di[oxy(polyethyleneoxy) ethanols] which is prepared as explained in Example 23 supra and maintained at about 40° C. with stirring, there is added, dropwise, 400 grams of a 26.2 weight percent solution of peracetic acid in ethyl acetate over a period of 2.5 hours. After an additional 6 hours at about 40° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product, thus obtained, is identified as a mixture of 4-oxatetracyclo [6.2.1.0$^{2,6}$.0$^{3,5}$]undec-9,10-ylene-di[oxy(polyethyleneoxy) ethanols] by inspection of its infrared absorption spectrum.

EXAMPLE 25

To a reaction vessel which contains 50 grams of tetracyclo[6.2.1.1$^{3,6}$.0$^{2,7}$]dodec-9-ene-4,5-diol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 280 grams. Then the resulting reaction product mixture is cooled, followed by neutralizing the catalyst with acetic acid. The reaction product mixture is washed twice with aqueous solution of sodium chloride, and then washed with water. The product, a mixture of tetracyclo[6.2.1.1$^{3,6}$.0$^{2,7}$]dodec-9-en-4,5-ylene-di[oxy(polyethyleneoxy)ethanols], is dried at an elevated temperature under reduced pressure.

EXAMPLE 26

To a reaction vessel which contains 80 grams of ethyl acetate and 80 grams of the mixture of tetracyclo [6.2.1.1$^{3,6}$.0$^{2,7}$]dodec-9-en-4,5-ylene-di[oxy(polyethyleneoxy)ethanols] which is prepared as explained in Example 25 as supra and maintained at about 45° C. with stirring, there is added, dropwise, 300 grams of a 26.7 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as a mixture of 10-oxapentacyclo [6.3.1.1$^{3,6}$.0$^{2,7}$.0$^{9,11}$]tridec-4,5-ylene-di[oxy(polyethyleneoxy)ethanols] by inspection of its infrared absorption spectrum.

EXAMPLE 27

To 110 grams of the compound, tetracyclo

[6.2.1.1$^{3,6}$.0$^{2,7}$]

dodec-9-en-4,5-ylene-dimethanol (prepared via the Diels-Alder synthesis of 2 mols of cyclopentadiene with one mol of 2-butene-1,4-diol), there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4,5-ylene-di(methyleneoxyethanol), is dried at an elevated temperature under reduced pressure.

EXAMPLE 28

To a reaction vessel which contains 70 grams of tetracyclo[6.2.1.1$^{3,6}$.0$^{2,7}$]dodec-9-en-4,5-ylene-di(methyleneoxyethanol) maintained at about 30° C. with stirring, there is added, dropwise, 300 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[$6.3.1.1^{3,6}.0^{2,7}.0^{9,11}$]-tridec-4,5-ylene-di(methyleneoxyethanol) by inspection of its infrared absorption spectrum.

EXAMPLE 29

To a reaction vessel which contains 80 grams of tricyclo[$5.2.1.0^{2,6}$]dec-3-en-8,9-ylene - di(oxyethanol) (prepared by heating 0.5 mol of tricyclo[$5.2.1.0^{2,6}$]dec-3-ene-8,9-diol with one mol of ethylene oxide in the presence of potassium hydroxide catalyst) maintained at about 30° C. with stirring, there is added, dropwise, 150 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo

[$6.2.1.0^{2,7}.0^{3,5}$]

undec-9,10-ylene-di-(oxyethanol) by inspection of its infrared absorption spectrum.

EXAMPLE 30

A. To a reaction vessel which contains 60 grams of tricyclo[$5.2.1.0^{2,6}$]dec-3-en - 9,10 - ylene - di(oxyethanol), which results from the reaction of tricyclo[$5.2.1.0^{2,6}$]dec-3-ene-9,10-diol with two mols of ethylene oxide under the influence of heat and potassium hydroxide, maintained at about 30° C. with stirring, there is added, dropwise, 80 grams of a 24.8 weight percent solution of peracetic acid in ethyl acetate over a period of 2 hours. After an additional 5 hours at about 30° C., the reaction is essentially complete as indicated by a titration for peracetic acid. The volatile materials, i.e., ethyl acetate, acetic acid by-product, etc. are removed from the reaction product mixture by co-distillation with ethylbenzene. The viscous liquid product, thus obtained, is identified as 4-oxatetracyclo[$6.2.1.0^{2,7}.0^{3,5}$]undec-10,11-ylene-di(oxyethanol) by inspection of its infrared absorption spectrum.

EXAMPLE 31

A. To a reaction vessel which contains 70 grams of tetracyclo[$6.2.1.1^{3,6}.0^{2,7}$]dodec-9-en - 4,5 - ylene - di(oxyethanol), which results from the potassium hydroxide-catalyzed reaction of two mols of ethylene oxide with tetracyclo[$6.2.1.1^{3,6}.0^{2,7}$]dodec-9-ene-4,5-diol under the influence of heat, maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo

[$6.3.1.1^{3,6}.0^{2,7}.0^{9,11}$]

tridec-4,5-ylene-di(oxyethanol) by inspection of its infrared absorption spectrum.

EXAMPLE 32

To a reaction vessel which contains 50 grams of tetracyclo[$6.2.1.1^{3,6}.0^{2,7}$]dodec-9-en-4,5 - ylene - di(methyleneoxyethanol) maintained at about 30° C. with stirring, (prepared by heating 0.5 mol of tetracyclo[$6.2.1.1^{3,6}.0^{2,7}$]dodec-9-en-4,5-ylene-dimethanol with one mol of ethylene oxide in the presence of potassium hydroxide catalyst) there is added, dropwise, 140 grams of a 25.2 weight percent solution of peracetic acid in ethyl acetate over a period of 2 hours. After an additional 4 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo

[$6.3.1.1^{3,6}.0^{2,7}.0^{9,11}$]

tridec-4,5-ylene-di(methyleneoxyethanol) by inspection of its infrared absorption spectrum.

EXAMPLE 33

To a reaction vessel, there was charged 4.98 grams of 2,3-epoxycyclopentanol and 2.44 grams of maleic anhydride. The resulting admixture was heated until homogeneous, and then 2.58 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a hard, strong resin which possessed a Barcol hardness value of 69.

EXAMPLE 34

To a reaction vessel, there was charged 5.85 grams of 2,3-epoxy-2-ethylhexanol and 2.01 grams of maleic anhydride. The resulting admixture was heated until homogeneous, and then 2.14 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a tough, flexible resin.

EXAMPLE 35

To a reaction vessel, there was charged 6.76 grams of 4 - oxatetracyclo[$6.2.1.0^{2,7}.0^{3,5}$]undec - 9 - oxyethanol and 1.57 grams of maleic anhydride. The resulting admixture was heated until homogeneous, and then 1.67 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a hard, strong resin which possessed a Barcol hardness value of 38.

EXAMPLE 36

To a reaction vessel, there was charged 5.35 grams of 4-methyl-4,5-epoxypentan-2-ol and 2.26 grams of maleic anhydride. The resulting admixture was heated until homogeneous, and then 2.39 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a hard, strong resin which possessed a Barcol hardness value of 45.

EXAMPLE 37

To a reaction vessel, there was charged 6.25 grams of 10 - oxapentacyclo[$6.3.1.1^{3,6}.0^{2,7}.0^{9,11}$]tridecan - 4 - ol and 1.82 grams of maleic anhydride. The resulting admixture was heated until homogeneous, and then 1.93 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a hard, strong resin which possessed a Barcol hardness value of 67.

EXAMPLE 38

To a reaction vessel, there was charged 6.43 grams of 10 - oxapentacyclo[$6.3.1.1^{3,6}.0^{2,7}.0^{9,11}$]tridec-4-ylmethanol and 1.73 grams of maleic anhydride. The resulting admixture was heated until homogeneous, and then 1.84 grams of styrene was added to the homogeneous admixture which was maintained at about 35° to 40° C. Lastly, 0.0014 gram of benzoyl peroxide was added thereto. Subsequently, the contents in the reaction vessel were heated to 50° C. for 5 hours plus 1 hour at 120° C. plus an additional 2 hours at 160° C. There was obtained a hard, strong resin which possessed a Barcol hardness value of 67.

EXAMPLES 39–45

To several test tubes, there were charged varying amounts of 4-oxatetracyclo[6.2.1.0$^{2,7}$.0$^{3,5}$]undecan-9-ol, maleic anhydride, and styrene. The resulting admixtures subsequently were cured as follows: 6.5 hours at 50° C.; 6 hours at 80° C.; 2 hours at 120° C.; and 4 hours at 160° C. The pertinent data is set forth in Table I below.

*Table I*

| Example No. | Weight in Grams | | | Ratio [1] | Resin Description |
|---|---|---|---|---|---|
| | Monoepoxy Alcohol | Maleic Anhydride | Styrene | | |
| 39 | 3.54 | 3.13 | 3.33 | 1.5/1.5/1.0 | Hard, Barcol, 54. |
| 40 | 4.52 | 2.66 | 2.82 | 1.0/1.0/1.0 | Tough, Barcol, 64. |
| 41 | 5.07 | 2.39 | 2.54 | 0.8/0.8/1.0 | Do. |
| 42 | 5.78 | 2.05 | 2.17 | 0.6/0.6/1.0 | Hard, Barcol, 60. |
| 43 | 6.72 | 1.59 | 1.69 | 0.4/0.4/1.0 | Hard, Barcol, 40. |
| 44 | 8.04 | 0.95 | 1.01 | 0.2/0.2/1.0 | Tough, soft. |
| 45 | 8.92 | 0.52 | 0.56 | 0.1/0.1/1.0 | Soft and tacky. |

[1] Ratio of mols of styrene, maleic anhydride, and monoepoxy alcohol, respectively.

EXAMPLES 46–50

To various test tubes, there are added 4-oxatetracylo-[6.2.1.0$^{2,7}$.0$^{3,5}$]undecane-9,10-diol and maleic anhydride in amounts so as to provide 1.0 carboxy group of said anhydride per epoxy group of said diol. The resulting admixtures are heated until a uniform melt occurs. Thereafter, the admixtures are cooled to about 35° C. and an ethylenically unsaturated monomer is added thereto in an amount so as to provide from 0.8 ethylenic group per ethylenic group of said maleic anhydride. Then, benzoyl peroxide (0.1 weight percent, based on the weight of total charge) is added. After gelation occurs, the systems are heated to 160° C. for a period of 6 hours. The following data is recorded in Table II below.

*Table II*

| Example No. | Ethylenic Monomer | Description of Resin |
|---|---|---|
| 46 | Triallylamine | Hard solid. |
| 47 | Triallylcyanurate | Do. |
| 48 | p-Chlorostyrene | Do. |
| 49 | alpha-Methylstyrene | Do. |
| 50 | Divinylbenzene | Do. |

EXAMPLE 51

10 - oxapentacyclo[6.3.1.1$^{3,6}$.0$^{2,7}$.0$^{9,11}$]tridecane - 4,5-diol and itaconic anhydride are admixed in amounts so as to provide 1.0 carboxy group of said itaconic anhydride per epoxy group of said diol. Subsequently, to this admixture there is added styrene in an amount so as to provide 0.6 ethylenic group per ethylenic group of said itaconic anhydride. The resulting admixture is heated to about 120° C. for approximately 0.5 hour plus an additional 8 hours at 160° C. There is obtained a strong, tough resin.

EXAMPLE 52

10 - oxapentacyclo[6.3.1.1$^{3,6}$.0$^{2,7}$.0$^{9,11}$]tridec - 4 - oxyethanol (prepared as set forth in Example 4 supra), aconitic anhydride, and divinylbenzene are admixed in amounts so as to provide 0.9 carboxy group of said aconitic anhydride per epoxy group of said monoepoxy alcohol, and from 1.0 ethylenic group of said divinylbenzene per ethylenic group of said aconitic anhydride. The resulting admixture is heated to about 120° C. for approximately 2 hours plus an additional 8 hours at 180° C. There is obtained a strong, hard resin.

EXAMPLE 53

10 - oxapentacyclo[6.3.1.1$^{3,6}$.0$^{2,7}$.0$^{9,11}$]tridec - 4,5-ylene-dimethanol (prepared in the manner described in Example 8 supra) and tetrahydrophthalic anhydride are admixed in amounts so as to provide 0.8 carboxy group of said anhydride per epoxy group of said monoepoxy alcohol. Subsequently, to this admixture there is added triallyl cyanurate in an amount so as to provide 0.8 ethylenic group per ethylenic group of said anhydride. The resulting admixture then is heated to about 120° C. for 3 hours plus an additional 6 hours at 160° C. There is obtained a hard resin.

EXAMPLE 54

10 - oxapentacyclo[6.3.1.1$^{3,6}$.0$^{2,7}$.0$^{9,11}$]tridec - 4 - ylmethanol (prepared in the manner described in Example 8 supra) and itaconic anhydride are admixed in amounts so as to provide 1.2 carboxy groups of said anhydride per epoxy group of said monoepoxy alcohol. Subsequently, to this admixture there is added methyl methacrylate in an amount so as to provide 0.8 ethylenic group per ethylenic group of said anhydride. The resulting admixture then is heated to about 120° C. for 2 hours plus an additional 6 hours at 160° C. There is obtained a hard resin.

EXAMPLE 55

Glycerol mono - 4 - oxatetracyclo[6.2.1.0$^{2,7}$.0$^{3,5}$]undec-9-enyl ether (prepared in the manner described in Example 12 supra) and chloromaleic anhydride are admixed in amounts so as to provide 1.0 carboxy group of said anhydride per epoxy group of said ether. Subsequently, to this admixture there is added diallyl phthalate in an amount so as to provide 0.7 ethylenic group per ethylenic group of said anhydride. The resulting admixture then is heated to about 120° C. for 2 hours plus an additional 6 hours at 160° C. There is obtained a solid resin.

EXAMPLE 56

4 - oxatetracyclo[6.2.1.0$^{2,6}$.0$^{3,5}$]undec - 9 - oxy - n-butanol (prepared in the manner described in Example 13 supra) and methylbicyclo[2.2.1]hept-5-ene-2,3-dicarboxylic acid anhydride are admixed in amounts so as to provide 1.1 carboxy groups of said anhydride per epoxy group of said monoepoxy alcohol. Subsequently, to this admixture there is added triallyl cyanurate in an amount so as to provide 0.5 ethylenic group per ethylenic group of said anhydride. The resulting admixture then is heated to about 120° C. for 3 hours plus an additional 6 hours at 160° C. There is obtained a hard, solid resin.

EXAMPLE 57

Pentaerythritol mono - 4 - oxatetracyclo[6.2.1.0$^{2,7}$.0$^{3,5}$]-undec-9-yl ether (prepared in the manner described in Example 14 supra) and maleic anhydride are admixed in amounts so as to provide 1.0 carboxy group of said anhydride per epoxy group of said ether. Subsequently, to this admixture there is added ethyl acrylate in an amount so as to provide 0.8 ethylenic group per ethylenic group of said anhydride. The resulting admixture then is heated to about 120° C. for 4 hours plus an additional 4 hours at 160° C. There is obtained a hard, solid resin.

EXAMPLE 58

Glycerol mono - 10 - oxapentacyclo[6.3.1.1$^{3,6}$.0$^{2,7}$.0$^{9,11}$] tridec-4-yl ether (prepared in the manner described in Example 16 supra) and citraconic anhydride are admixed in amounts so as to provide 1.0 carboxy group of said anhydride per epoxy group of said ether. Subsequently, to this admixture there is added diallyl ether in an amount so as to provide 0.5 ethylenic group per ethylenic group of said anhydride. The resulting admixture then is heated to about 120° C. for 1 hour plus an additional 6 hours at 160° C. There is obtained a hard, solid resin.

EXAMPLE 59

A mixture of 10-oxapentacyclo-[6.3.1.1$^{3,6}$.0$^{2,7}$.0$^{9,11}$]tridec-4-oxy(polyethyleneoxy)ethanols (prepared in the manner described in Example 20 supra) and chloromaleic anhydride are admixed in amounts so as to provide 0.8 carboxy group of said anhydride per epoxy group of said monoepoxy alcohol mixture. Subsequently, to this admixture there is added diallyl ether in an amount so as to provide 0.7 ethylenic group per ethylenic group of said anhydride. The resulting admixture then is heated to about 120° C. for 2 hours plus an additional 6 hours at 160° C. There is obtained a solid resin.

EXAMPLE 60

A mixture of 4-oxatetracyclo[6.2.1.0$^{2,6}$.0$^{3,5}$]-undec-9,10-ylene-di[oxy(polyethyleneoxy)ethanols] prepared as set forth in Example 25 supra and itaconic anhydride are admixed in amounts so as to provide 1.0 carboxy group of said anhydride per epoxy group of said monoepoxy alcohol mixture. Subsequently, to this admixture there is added allyl benzoate in an amount so as to provide 0.8 ethylenic group per ethylenic group of said anhydride. The resulting admixture then is heated to about 120° C. for 4 hours plus an additional 4 hours at 160° C. There is obtained a hard, solid resin.

EXAMPLE 61

3,4-epoxycyclohexanol and maleic anhydride are admixed in amounts so as to provide 1.1 carboxy groups of said anhydride per epoxy group of said 3,4-epoxycyclohexanol. Subsequently, to this admixture there is added allyl methacrylate in an amount so as to provide 0.8 ethylenic group per ethylenic group of said anhydride. The resulting admixture then is heated to about 70° C. for 2 hours plus an additional 5 hours at 160° C. There is obtained a hard, solid resin.

EXAMPLE 62

3 - oxatricyclo[3.2.1.0$^{2,4}$]octan - 6 - ol and tetrahydrophthalic anhydride are admixed in amounts so as to provide 1.0 carboxy group of said anhydride per epoxy group of said monoepoxy alcohol. Subsequently, to this admixture there is added ethyl acrylate in an amount so as to provide 0.3 ethylenic group per ethylenic group of said anhydride. The resulting admixture then is heated to about 120° C. for 2.5 hours plus an additional 4 hours at 160° C. There is obtained a hard, solid resin.

EXAMPLE 63

10-oxapentacyclo-[6.3.1.1$^{3,6}$.0$^{2,7}$.0$^{9,11}$]tridec - 4,5 - lyene-di(methyleneoxyethanol) and itaconic anhydride are admixed in amounts so as to provide 1.0 carboxy group of said anhydride per epoxy group of said monoepoxy alcohol. Subsequently, to this admixture there is added styrene in an amount so as to provide 1.0 ethylenic group per ethylenic group of said anhydride. The resulting admixture then is heated to about 80° C. for 1.5 hours plus an additional 4 hours at 160° C. There is obtained a hard, solid resin.

EXAMPLE 64

4 - oxatetracyclo[6.2.1.0$^{2,7}$.0$^{3,5}$]undec - 9,10 - ylene - di(oxyethanol) prepared in the manner set forth in Example 29 supra and citraconic anhydride are admixed in amounts so as to provide 0.8 carboxy group of said anhydride per epoxy group of said monoepoxy alcohol. Subsequently, to this admixture there is added methyl methacrylate in an amount so as to provide 0.2 ethylenic group per ethylenic group of said anhydride. The resulting admixture then is heated to about 120° C. for 3 hours plus an additional 5 hours at 160° C. There is obtained a hard, solid resin.

EXAMPLE 65

10 - oxapentacyclo[6.3.1.1$^{3,6}$.0$^{2,7}$.0$^{9,11}$]tridec - 4,5-ylene-di(methyleneoxyethanol) prepared in the manner set forth in Example 32 supra and maleic anhydride are admixed in amounts so as to provide 0.9 carboxy group of said anhydride per epoxy group of said monoepoxy alcohol. Subsequently, to this admixture there is added styrene in an amount so as to provide 0.3 ethylenic group per ethylenic group of said anhydride. The resulting admixture then is heated to about 80° C. for 2 hours plus an additional 4 hours at 160° C. There is obtained a hard, solid resin.

Reasonable variations and modifications of the invention can be made or carried out in the light of the above disclosure without departing from the spirit and scope thereof.

What is claimed is:

1. A curable, polymerizable composition comprising (1) a saturated monoepoxy alcohol compound selected from the group consisting of:

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1.$^{3,6}$.0$^{2,7}$.0$^{9,11}$] tridecan-4-ol,
(g) 10-oxapentacyclo[6.3.1.1$^{3,6}$.0$^{2,7}$.0$^{9,11}$] tridecane-4,5-diol,
(h) 10-oxapentacyclo[6.3.1.1$^{3,6}$.0$^{2,7}$.0$^{9,11}$] tridec-4-ylalkanol,
(i) 10-oxapentacyclo[6.3.1.1$^{3,6}$.0$^{2,7}$.0$^{9,11}$] tridec-4,5-ylenedialkanol,
(j) 10-oxapentacyclo[6.3.1.1$^{3,6}$.0$^{2,7}$.0$^{9,11}$] tridec-4-oxyalkanol,
(k) 10-oxapentacyclo[6.3.1.1$^{3,6}$.0$^{2,7}$.0$^{9,11}$] tridec-4-oxyalkane-poly-ol,
(l) 10-oxapentacyclo[6.3.1.1$^{3,6}$.0$^{2,7}$.0$^{9,11}$] tridec-4-ylmethylene-oxyalkanol,
(m) 10-oxapentacyclo[6.3.1.1$^{3,6}$.0$^{2,7}$.0$^{9,11}$] tridec-4-ylmethylene-oxyalkane-poly-ol,
(n) the 4-oxatetracyclo[6.2.1.0$^{2,7}$.0$^{3,5}$]undec-9-oxy(mono- and polyalkyleneoxy)alkanols,
(o) the 4-oxatetracyclo[6.2.1.0$^{2,7}$.0$^{3,5}$]undec-9-10,ylene-di[oxy(mono- and polyalkyleneoxy) alkanols],
(p) the 4-oxatetracyclo[6.2.1.0$^{2,7}$.0$^{3,5}$]undec-10,11-ylene-di[oxy(mono- and polyalkyleneoxy)alkanols],
(q) the 10-oxapentacyclo[6.3.1.1$^{3,6}$.0$^{2,7}$.0$^{9,11}$] tridec-4-oxy(mono- and polyalkyleneoxy) alkanols,
(r) the 10-oxapentacyclo[6.3.1.0$^{3,6}$.0$^{2,7}$.0$^{9,11}$] tridec-4,5-ylene-di[oxy(mono- and polyalkyleneoxy)alkanols], (s) 10-oxapentacyclo[6.3.1.$1^{3,6}$.$0^{2,7}$.$0^{9,11}$] tridec-4-ylalkyleneoxyalkanol, (t) the 10-oxapentacyclo[6.3.1.$1^{3,6}$.$0^{2,7}$.$0^{9,11}$] tridec-4-ylalkyleneoxy(mono- and polyalkyleneoxy)alkanols, (u) 10-oxapentacyclo[6.3.1.$1^{3,6}$.$0^{2,7}$.$0^{9,11}$] tridec-4,5-ylene-di(alkyleneoxyalkanol), (v) the 10-oxapentacyclo[6.3.1.$1^{3,6}$.$0^{2,7}$.$0^{9,11}$] tridec-4,5-ylene-di[alkyleneoxy(mono- and polyalkyleneoxy)alkanols], (w) mono visinal-epoxycycloalkanol, (x) mono vicinal-epoxycycloalkylalkanol, and (y) mono vicinal-epoxybicycloalkanol;

(2) an olefinically unsaturated hydrocarbon dicarboxylic acid anhydride; and (3) a monomeric ethylenically unsaturated compound which is polymerizable with said anhydride, said monomeric ethylenically unsaturated compound containing no functional groups which are reactive with vicinal epoxy groups and carboxy groups; in such relative amounts so as to provide from about 0.1 to about 5.0 carboxy groups of said anhydride per epoxy group of said monoepoxy alcohol compound, and from about 0.002 to about 5.0 ethylenic groups of said monomeric ethylenically unsaturated compound per ethylenic group of said anhydrides.

2. A curable, polymerizable composition comprising (a) 4-oxatetracyclo[6.2.1.$0^{2,7}$.$0^{3,5}$]undecan-9-ol, (b) an olefinically unsaturated dicarboxylic acid anhydride, and (c) a monomeric ethylenically unsaturated compound which contains no functional groups which are reactive with vicinal epoxy groups and carboxy groups; in such relative amount so as to provide from about 0.4 to about 3.0 carboxy groups of said anhydride per epoxy group of said 4-oxatetracyclo[6.2.1.$0^{2,7}$.$0^{3,5}$]undecan-9-ol, and from about 0.2 to about 2.0 ethylenic groups of said monomeric ethylenically unsaturated compound per ethylenic group of said anhydride.

3. The curable, polymerizable composition of claim 2 wherein said olefinically unsaturated dicarboxylic acid anhydride is maleic anhydride, and wherein said monomeric ethylenically unsaturated compound is styrene.

4. A curable, polymerizable composition comprising (a) 4 - oxatetracyclo[6.2.1.$0^{2,7}$.$0^{3,5}$]undecane - 9,10-diol, (b) an olefinically unsaturated dicarboxylic acid anhydride, and (c) a monomeric ethylenically unsaturated compound which contains no functional groups which are reactive with vicinal epoxy groups and carboxy groups; in such relative amounts so as to provide from about 0.4 to about 3.0 carboxy groups of said anhydride per epoxy group of said 4-oxatetracyclo[6.2.1.$0^{2,7}$.$0^{3,5}$]undecane-9,10-diol, and from about 0.2 to about 2.0 ethylenic groups of said monomeric ethylenically unsaturated compound per ethylenic group of said anhydride.

5. A curable, polymerizable composition comprising (a) 2,3-epoxycyclopentanol, (b) an olefinically unsaturated dicarboxylic acid anhydride, and (c) a monomeric ethylenically unsaturated compound; in such relative amounts so as to provide from about 0.4 to about 3.0 carboxy groups of said anhydride per epoxy group of said 2,3-epoxycyclopentanol, and from about 0.2 to about 2.0 ethylenic groups of said monomeric ethylenically unsaturated compound per ethylenic group of said anhydride.

6. A resin-forming process which comprises reacting (a) a saturated monoepoxy alcohol as described in claim 1, (b) an olefinically unsaturated polycarboxylic acid anhydride, and (c) a monomeric ethylenically unsaturated compound which contains no functional groups which are reactive with vicinal epoxy groups and carboxy groups; in such realtive amounts so as to provide from about 0.1 to about 5.0 carboxy groups of said anhydride per epoxy group of said monoepoxy alcohol compound, and from about 0.002 to about 5.0 ethylenic groups of said monomeric ethylenically unsaturated compound per ethylenic group of said anhydride; in the presence of a free radical catalyst; at a temperature in the range of from above about 25° to about 275° C.; for a period of time sufficient to produce a hard, solid resin.

References Cited by the Examiner

UNITED STATES PATENTS

| | | | |
|---|---|---|---|
| 2,476,922 | 7/1949 | Shokal et al. | 260—78.4 |
| 2,720,500 | 10/1955 | Cody | 260—873 |
| 2,761,870 | 9/1956 | Payne et al. | 260—78.4 |
| 2,781,333 | 2/1957 | Updegraff | 260—835 |
| 2,848,433 | 8/1958 | Eirich | 260—78.4 |
| 2,890,196 | 6/1959 | Phillips et al. | 260—78.4 |
| 3,042,686 | 7/1962 | O'Brien et al. | 260—78.4 |
| 3,046,246 | 7/1962 | Muskat | 260—836 |

MURRAY TILLMAN, *Primary Examiner.*

MILTON STERMAN, WILLIAM H. SHORT, LEON J. BERCOVITZ, *Examiners.*